(12) United States Patent
Seiter

(10) Patent No.: US 7,926,607 B2
(45) Date of Patent: Apr. 19, 2011

(54) THREE-WHEEL VEHICLE

(76) Inventor: Paul Seiter, San Diego, CA (US)

( * ) Notice: Subject to any disclaimer, the term of this patent is extended or adjusted under 35 U.S.C. 154(b) by 220 days.

(21) Appl. No.: 12/381,020

(22) Filed: Mar. 5, 2009

(65) Prior Publication Data

US 2009/0224497 A1    Sep. 10, 2009

(51) Int. Cl.
*B62D 61/06* (2006.01)
*B62K 5/06* (2006.01)

(52) U.S. Cl. ....... 180/210; 180/908; 180/69.4; 280/781; 280/782

(58) Field of Classification Search .................. 180/908, 180/311, 69.4, 312, 210, 358, 231; 280/781, 280/785–788, 62
See application file for complete search history.

(56) References Cited

U.S. PATENT DOCUMENTS

| | | | | |
|---|---|---|---|---|
| 3,945,463 A | * | 3/1976 | Okano et al. ................. | 184/6.13 |
| 7,806,215 B2 | * | 10/2010 | Codere et al. ................. | 180/210 |
| 7,815,008 B2 | * | 10/2010 | Poglavec ................. | 180/311 |
| 2004/0050605 A1 | * | 3/2004 | Fecteau et al. ................. | 180/210 |
| 2004/0256853 A1 | * | 12/2004 | Mercier et al. ................. | 280/834 |
| 2007/0251745 A1 | * | 11/2007 | Codere et al. ................. | 180/210 |

FOREIGN PATENT DOCUMENTS

| | | | | |
|---|---|---|---|---|
| JP | 64-32985 A | * | 2/1989 |
| JP | 1-197190 A | * | 8/1989 |
| JP | 1-204881 A | * | 8/1989 |
| JP | 1-275290 A | * | 11/1989 |
| JP | 5-58371 A | * | 3/1993 |
| JP | 8-207861 A | * | 8/1996 |

* cited by examiner

*Primary Examiner* — Ruth Ilan

(57) ABSTRACT

A three-wheel vehicle is provided, and includes a single upper frame element having left and right upper spars that each have a downward-extending portion. Left and right lower spars are connected to the upper spars. Left and right rear spars are connected to the left lower spar and the right lower spar, with a second end connected to a rear section of the single upper frame element. A rear suspension sub-frame is coupled to the rear spars, with a wheel rotatably coupled thereto, and a front suspension assembly is coupled to the upper spars, with a left and a right wheel rotatably coupled thereto. A seat is coupled to the rear suspension sub-frame, with the seat located so that when an operator is straddling the seat, a perineum of the operator is located below a plane defined by an upper-most point of each of the three wheels.

13 Claims, 19 Drawing Sheets

THREE-WHEEL VEHICLE

The adapted motorcycle and snowmobile frames, are generally not designed specifically to react to the types of torsional and binding stresses that are expected to be encountered by a three-wheeled vehicle during use.

One vehicle frame that was specifically developed for a three-wheeled vehicle is the frame incorporated into certain all terrain vehicles (or "ATVs") that were commercialized in the early to mid 1980's. The ATV included a single, front, steerable wheel and two, powered, rear wheels. While the frame for the ATV was specifically designed for a three-wheeled vehicle, the frame (and vehicle) did not address design parameters that arise when designing a vehicle for road use. First, being an ATV, the vehicle was specifically designed for off-road use. As a result, the vehicle was not constructed to handle the stresses encountered at road speeds. Second, because the vehicle included a single front balloon tire and two rear balloon tires, the vehicle had a relatively high center of gravity. As a result, the vehicle tended to be unstable at higher speeds. Third, in part because speed was not desired for the prior art three-wheeled ATV, the vehicle's engine provided an output power of only about 35 horsepower. The frame was designed to accommodate this low output and as a result, could not be adapted readily for road use.

Another vehicle frame specifically developed for a three-wheeled vehicle is the frame incorporated into a motorcycle with a side car. These frames are designed around a standard motorcycle frame with a wheel positioned at a point offset from the motorcycle frame. Unlike the ATV example, a frame for a motorcycle with a side car is adapted for road use. Also, because it is designed for road use, the engines of such motorcycles typically produce a greater output power than the engines incorporated into the prior art ATV. However, a motorcycle with a side car has a relatively high center of gravity, a center of gravity akin to that found on a motorcycle. As a result, motorcycles with side cars suffer from the same instability problem as the above-described frame designs. These motorcycles, accordingly, tend to be very unstable when making turns at high speeds.

In summary, a need has developed for a three-wheel vehicle that resolves these deficiencies.

Figure 1:
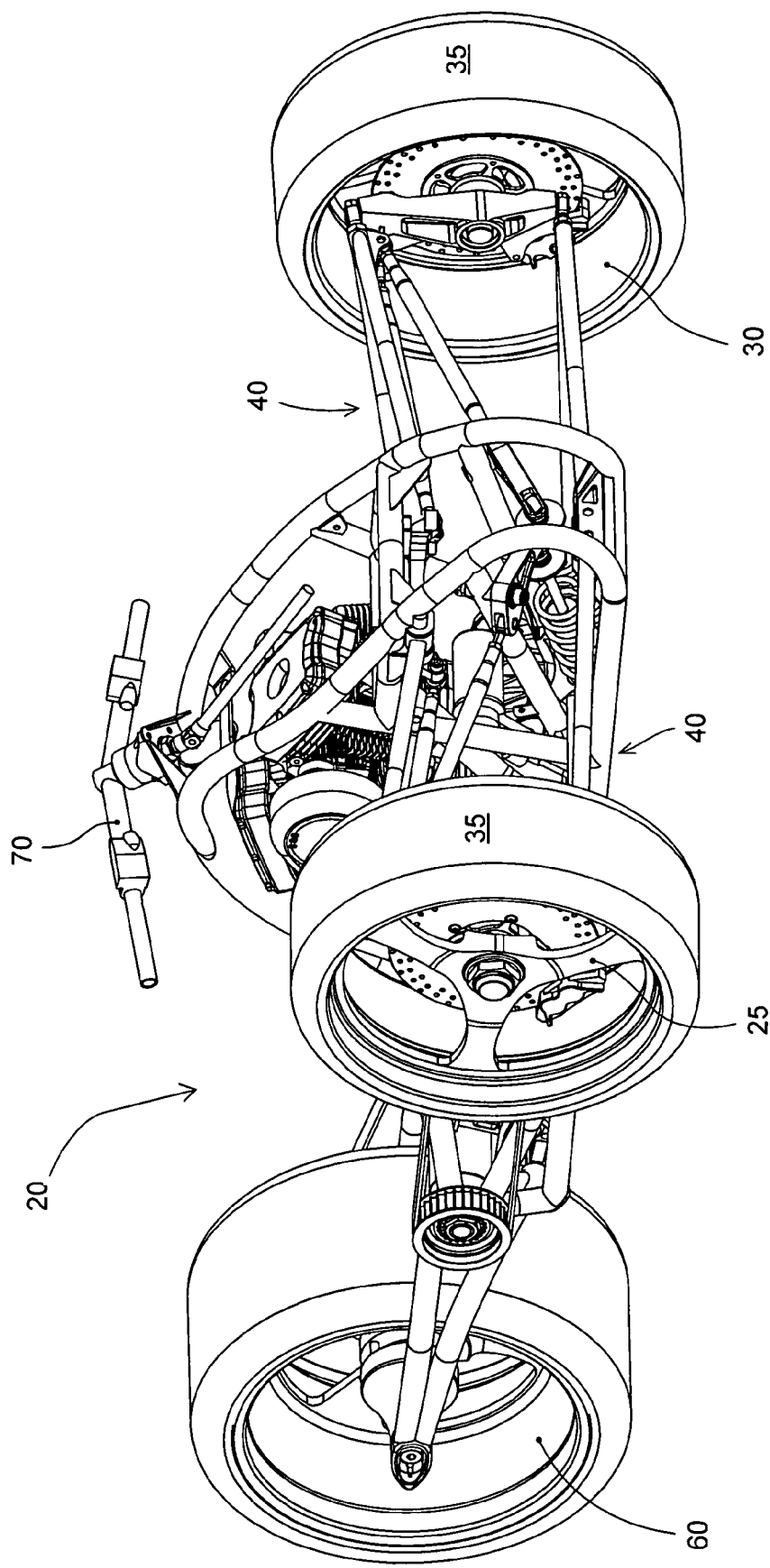
FIG. 1 is front right side perspective view of a three-wheel vehicle according to one embodiment of the present invention.
Figure 2:
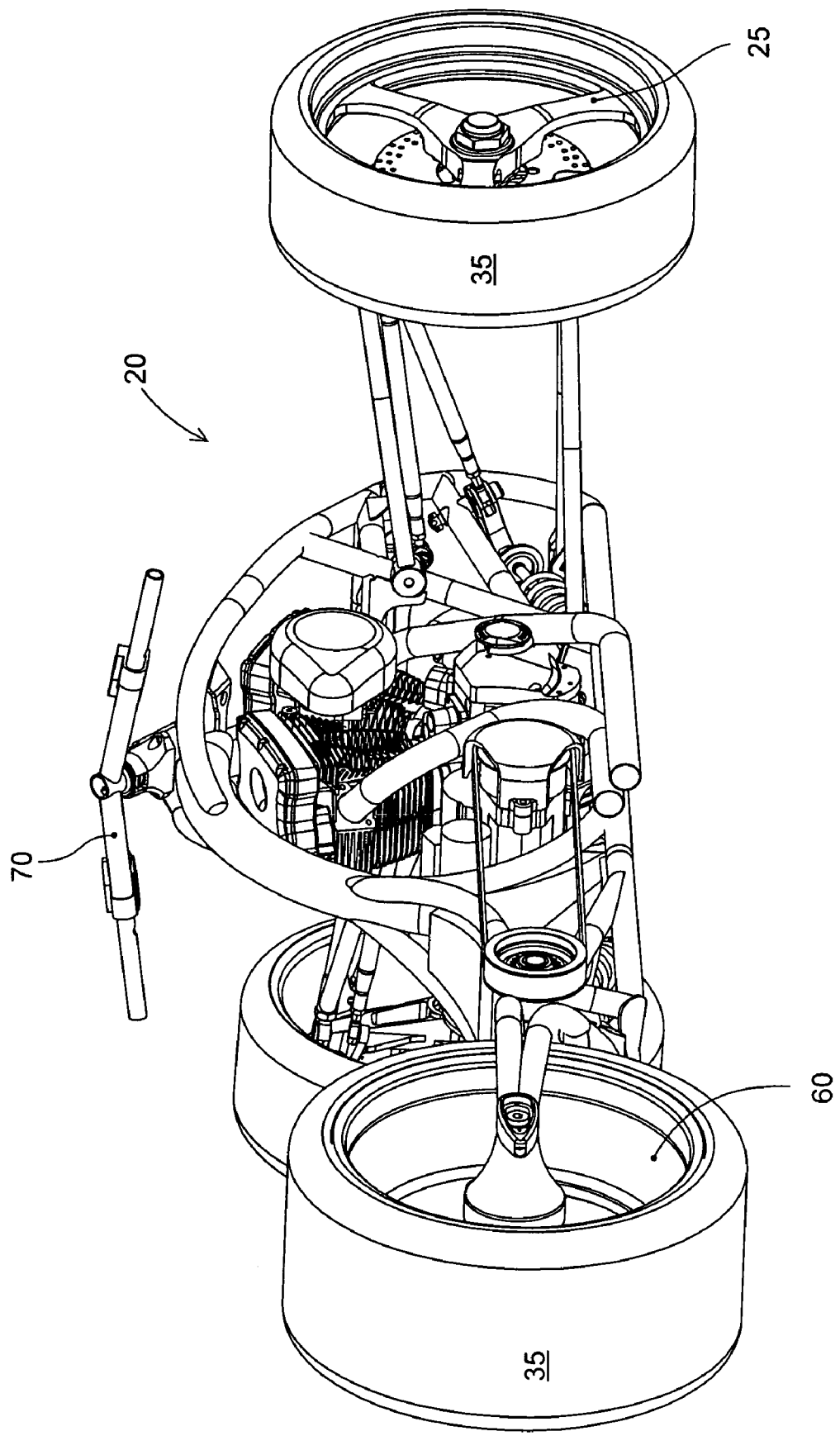
FIG. 2 is a right rear side perspective view of the vehicle illustrated in FIG. 1.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

In the following description, for the purposes of explanation, numerous specific details are set forth in order to provide a thorough understanding of the three-wheel vehicle (TWV) of the present invention. It will be apparent, however, to one skilled in the art that the three-wheel vehicle may be practiced without some of these specific details. Throughout this description, the embodiments and examples shown should be considered as exemplars, rather than as limitations on the three-wheel vehicle. That is, the following description provides examples, and the accompanying drawings show various examples for the purposes of illustration. However, these examples should not be construed in a limiting sense as they are merely intended to provide examples of the three-wheel vehicle rather than to provide an exhaustive list of all possible implementations of the three-wheel vehicle.

The present invention recognizes and solves one or more of the problems associated with conventional three-wheel vehicles by providing a vehicle frame that is specifically designed to be used as a three-wheel vehicle. Accordingly, one aspect of embodiments of the present invention provides a three-wheel, straddle-type vehicle having two front wheels and one rear wheel (a "TWV"). The TWV has improved maneuverability and control when compared to conventional three-wheel vehicles.

Before delving into the specific details of the three-wheel vehicle (TWV), it should be noted that the conventions "left," "right," "front," "rear," "up," and "down" are defined according to the normal, forward travel direction of the vehicle being discussed. As a result, the "left" side of a vehicle corresponds to the left side of a rider seated in a forward-facing position on the vehicle. Several illustrations of the TWV are included in provisional application Ser. No. 61/068,224, filed Mar. 5, 2008, entitled: "Three-Wheel Vehicle," which is referred to and incorporated herein in its entirety by this reference.

Referring now to FIGS. 1-6 and 18-19, a three-wheel vehicle (TWV) 20 is illustrated. Left and right laterally spaced front wheels 25, 30, each mounted with a tire 35 are supported by a front suspension assembly 40 (see FIGS. 7-11). The front suspension assembly 40 is supported by a frame assembly 45 (see FIGS. 12-17). An engine 50 is mounted in the frame assembly 45 with a drive train 55 coupled to the engine 50. The drive train 55 drives the rear wheel 60 (mounted with a tire 35) through a series of drive belts 65. The rider, or operator (not shown) straddles the seat 70 and steers the front wheels 25, 30 by operating the handlebar assembly 70.

The seat 75 includes a seat support 80 that, in one embodiment includes a fuel tank (not shown). One feature of the TWV 20 is that the seat 75 is positioned very low, about 20 to 21 inches from the ground (as measured from the area on the seat 75 that is contacted by the rider's perineum). Other embodiments may have the seat 75 positioned as high as 25 inches.

Figure 3:
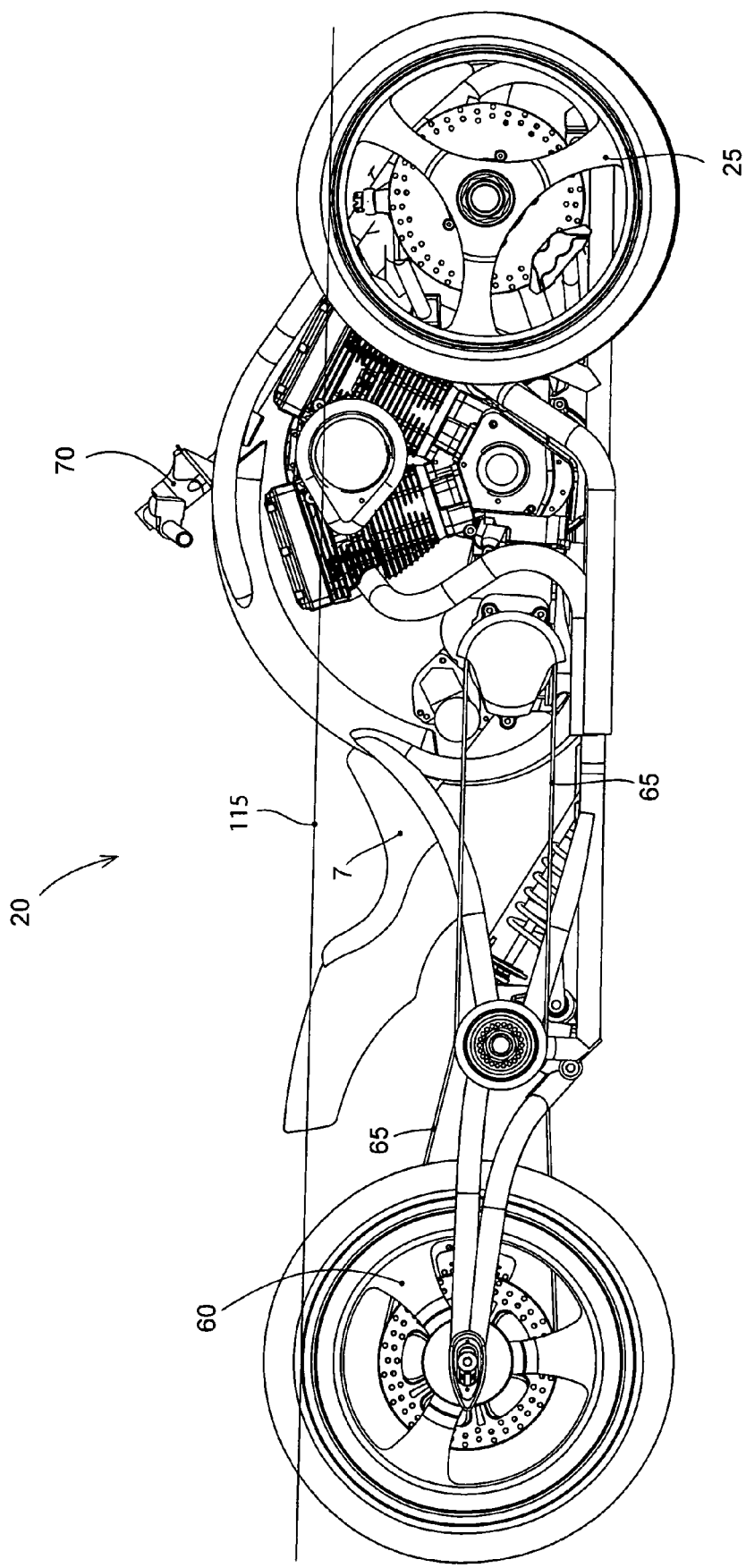
FIG. 3 is a right side view of the vehicle illustrated in FIG. 1.
Figure 4:
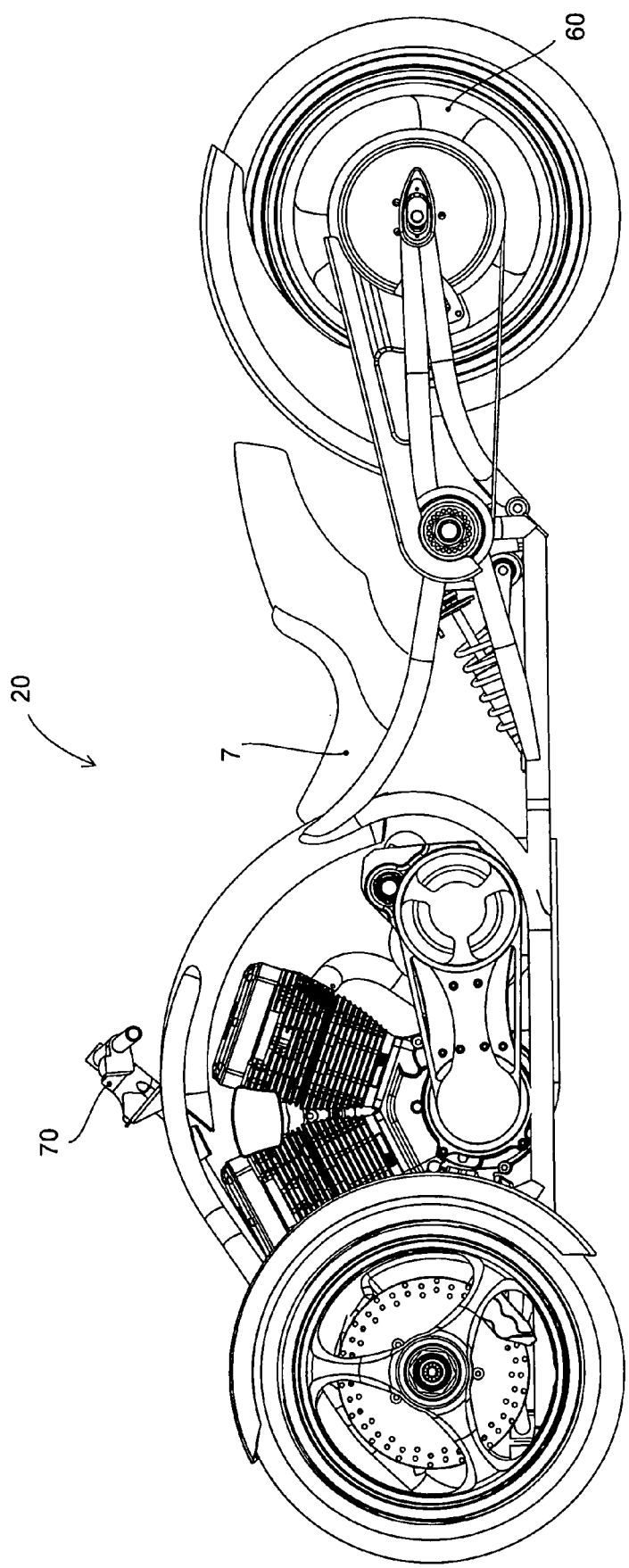
FIG. 4 is a left side view of the vehicle illustrated in FIG. 1.
Figure 5:
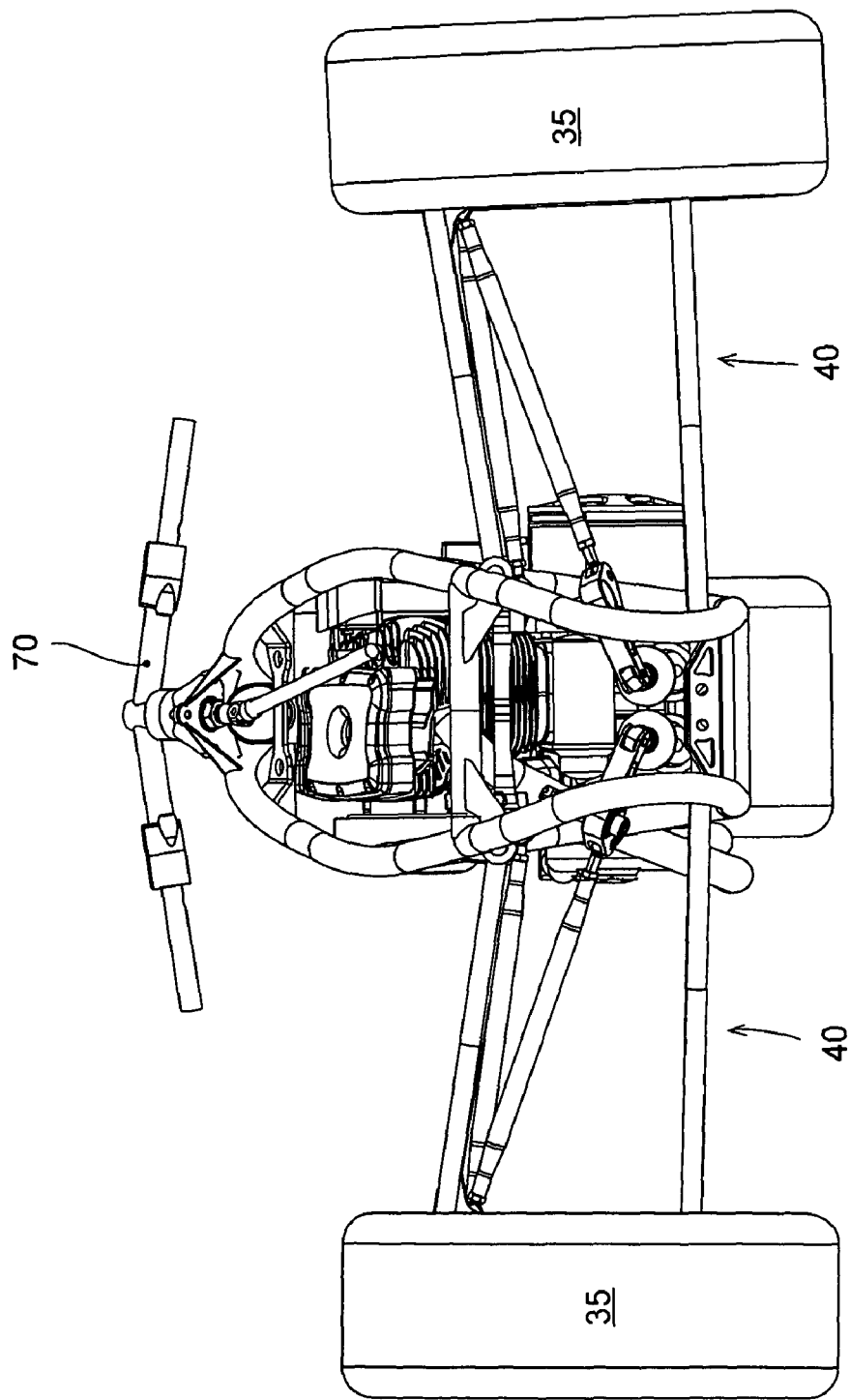
FIG. 5 is a front view of the vehicle illustrated in FIG. 1.
Figure 6:
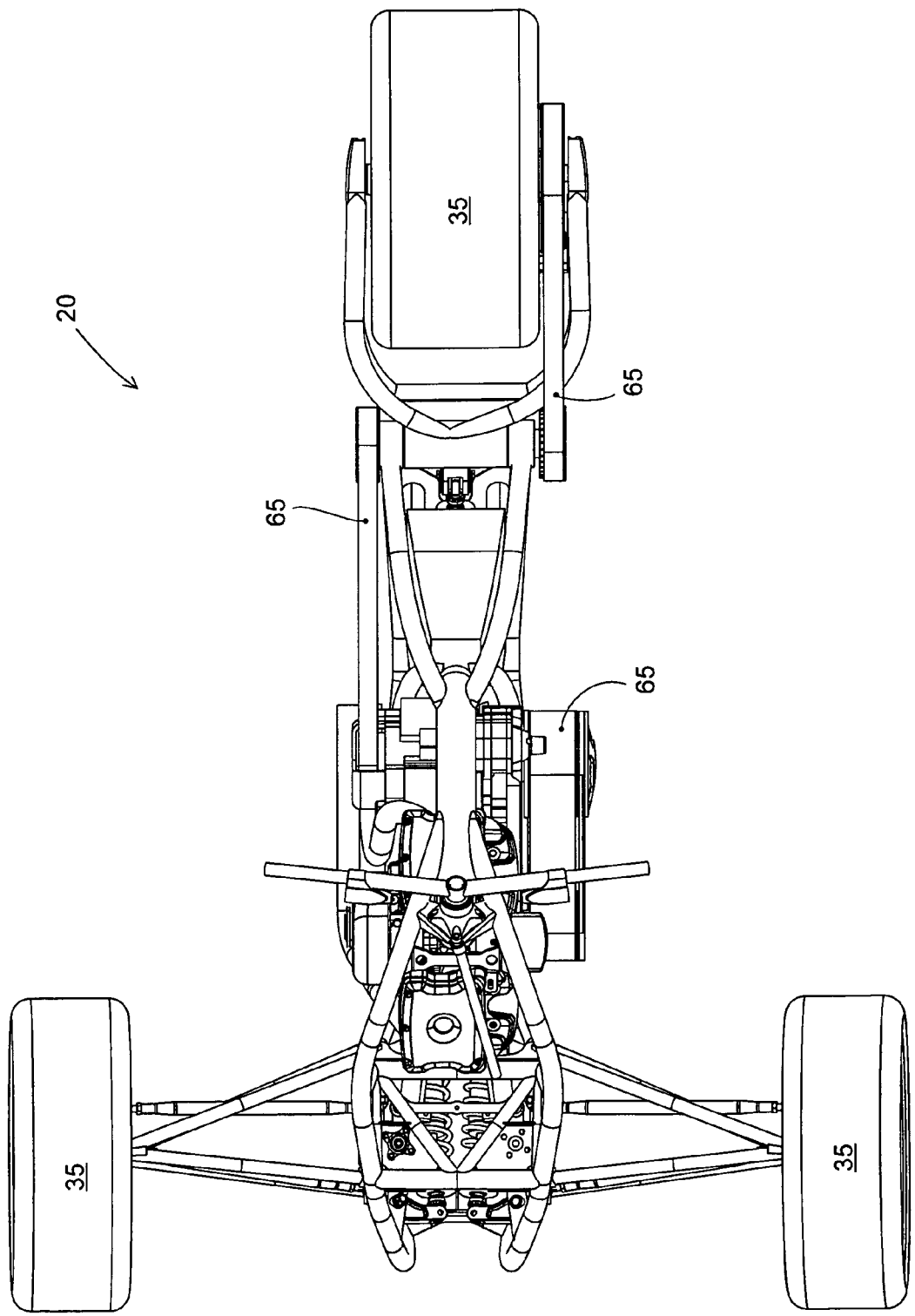
FIG. 6 is a top view of the vehicle illustrated in FIG. 1.
Figure 7:
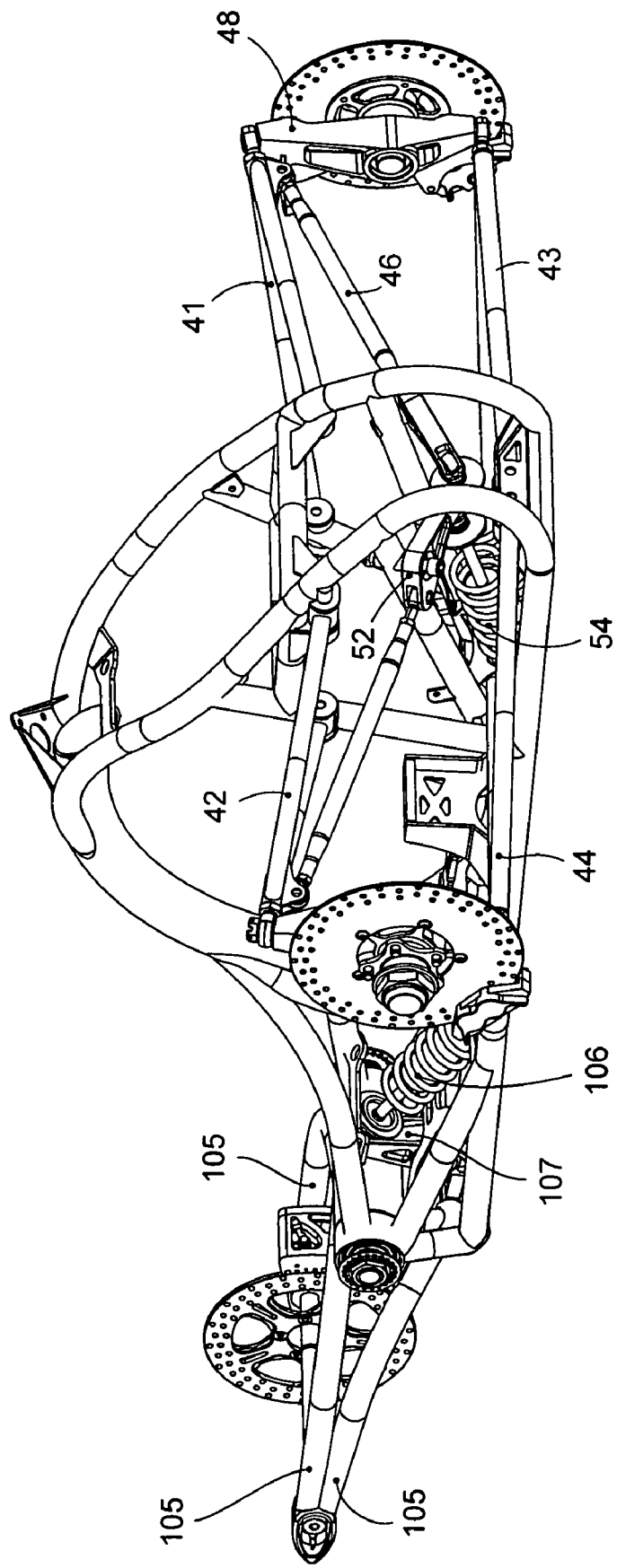
FIG. 7 is a front right side perspective view of the frame assembly, and the front and rear suspension assemblies of the vehicle illustrated in FIGS. 1-6.
Figure 8:
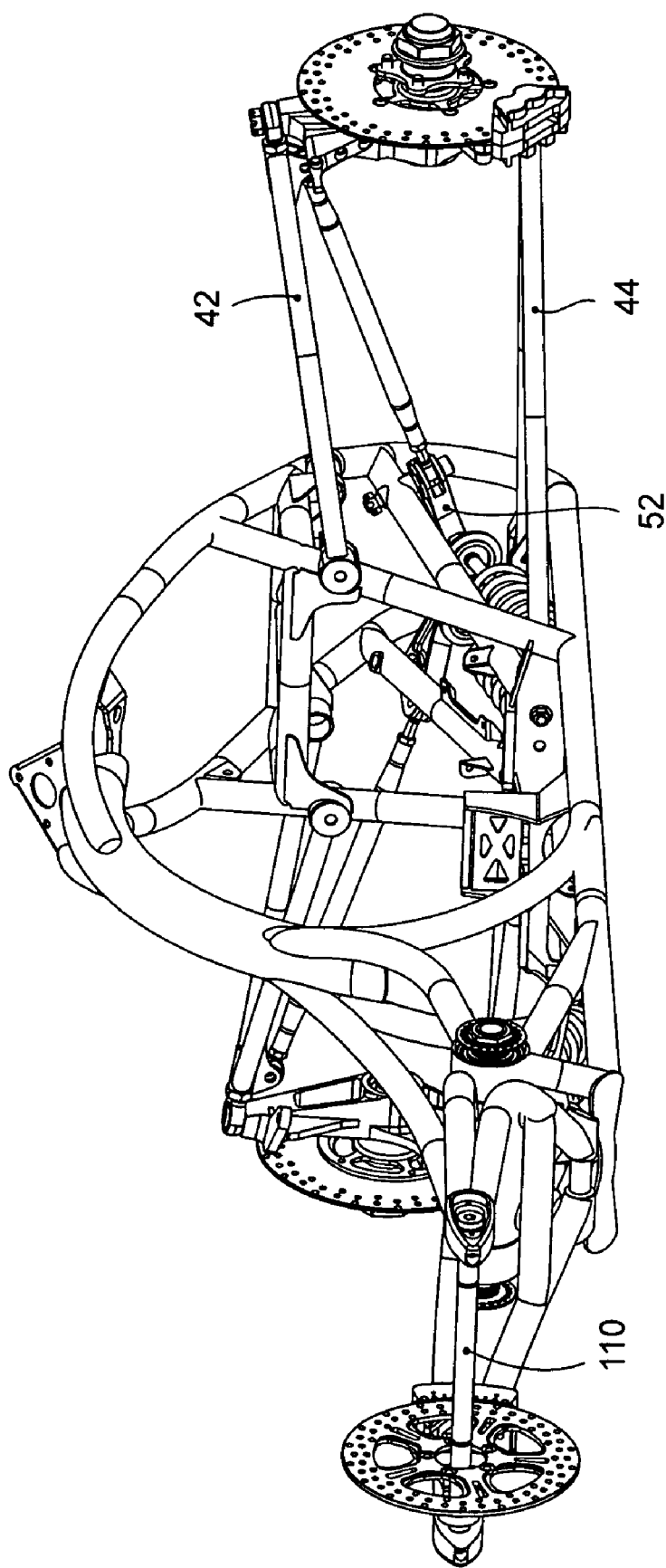
FIG. 8 is a right rear side perspective view of the frame assembly, and the front and rear suspension assemblies of the vehicle illustrated in FIGS. 1-6.
Figure 9:
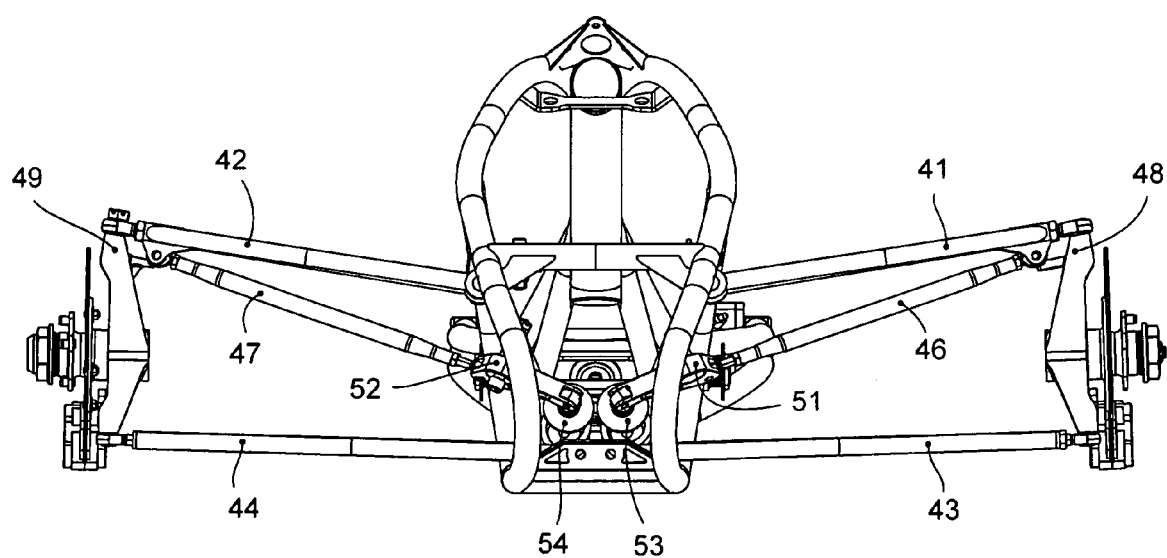
FIG. 9 is a front view of the frame assembly, and the front suspension assembly of the vehicle illustrated in FIGS. 1-6.
Figure 10:
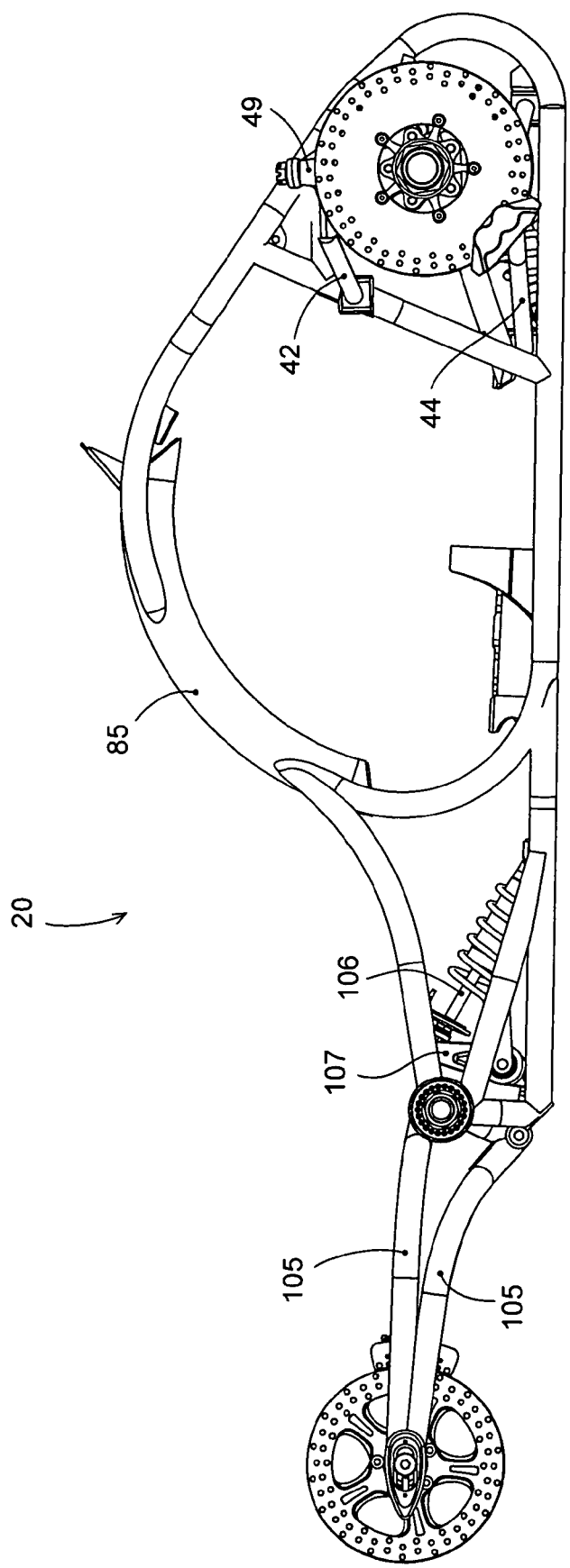
FIG. 10 is a right side view of the frame assembly, and the front and rear suspension assemblies of the vehicle illustrated in FIGS. 1-6.
Figure 11:
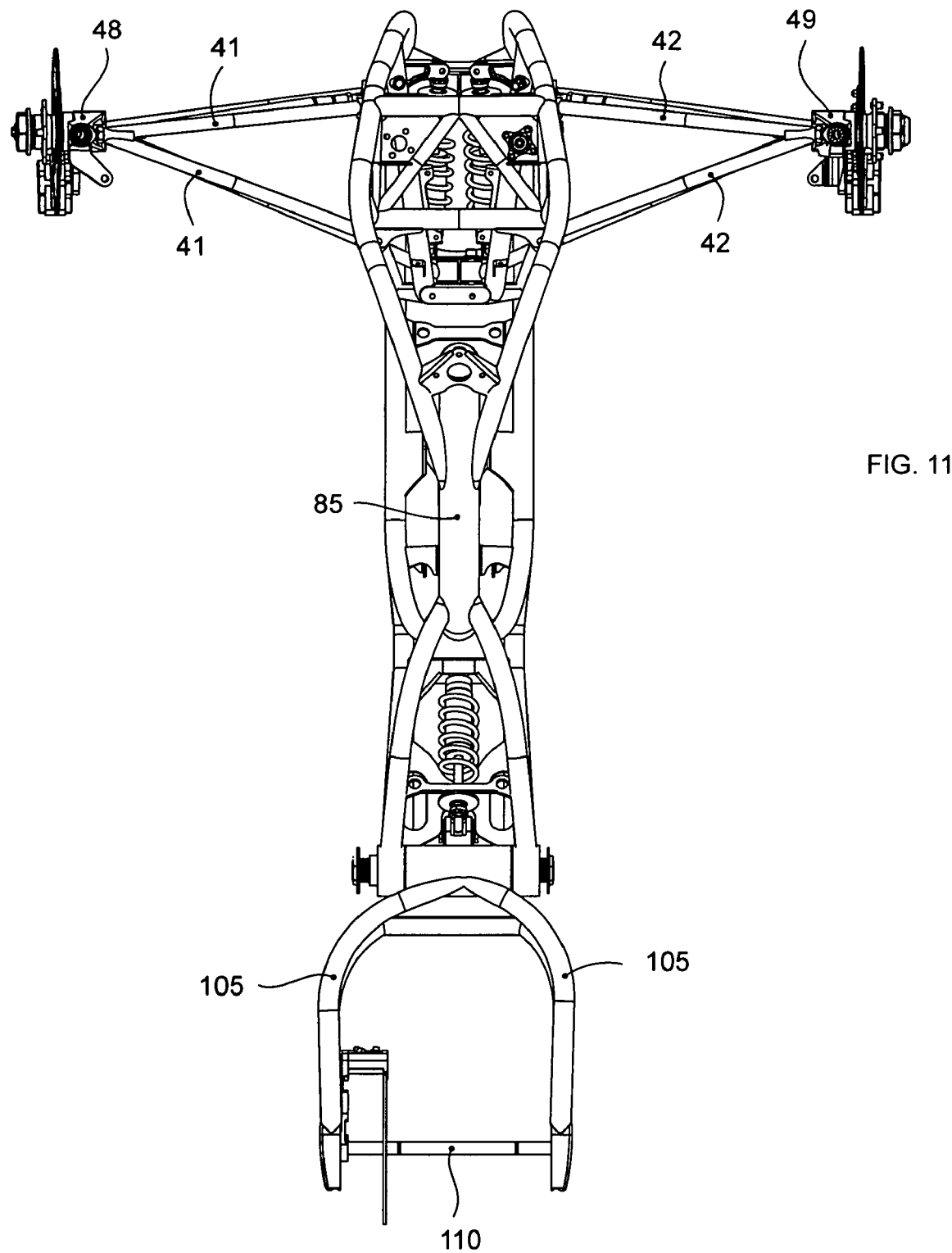
FIG. 11 is a top view of the frame assembly, and the front and rear suspension assemblies of the vehicle illustrated in FIGS. 1-6.
Figure 12:
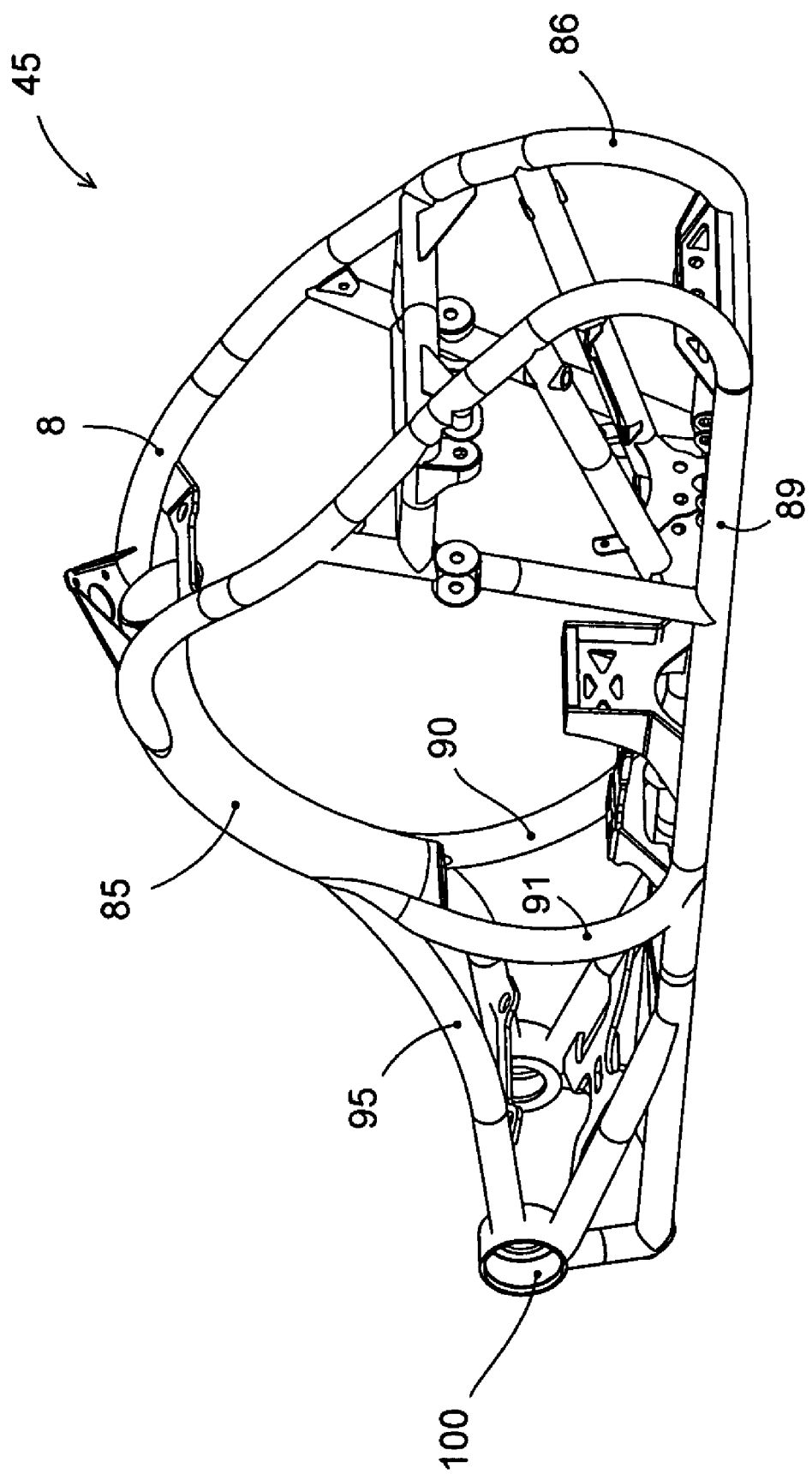
FIG. 12 is a front right side perspective view of the frame assembly of the vehicle illustrated in FIGS. 1-6.
Figure 13:
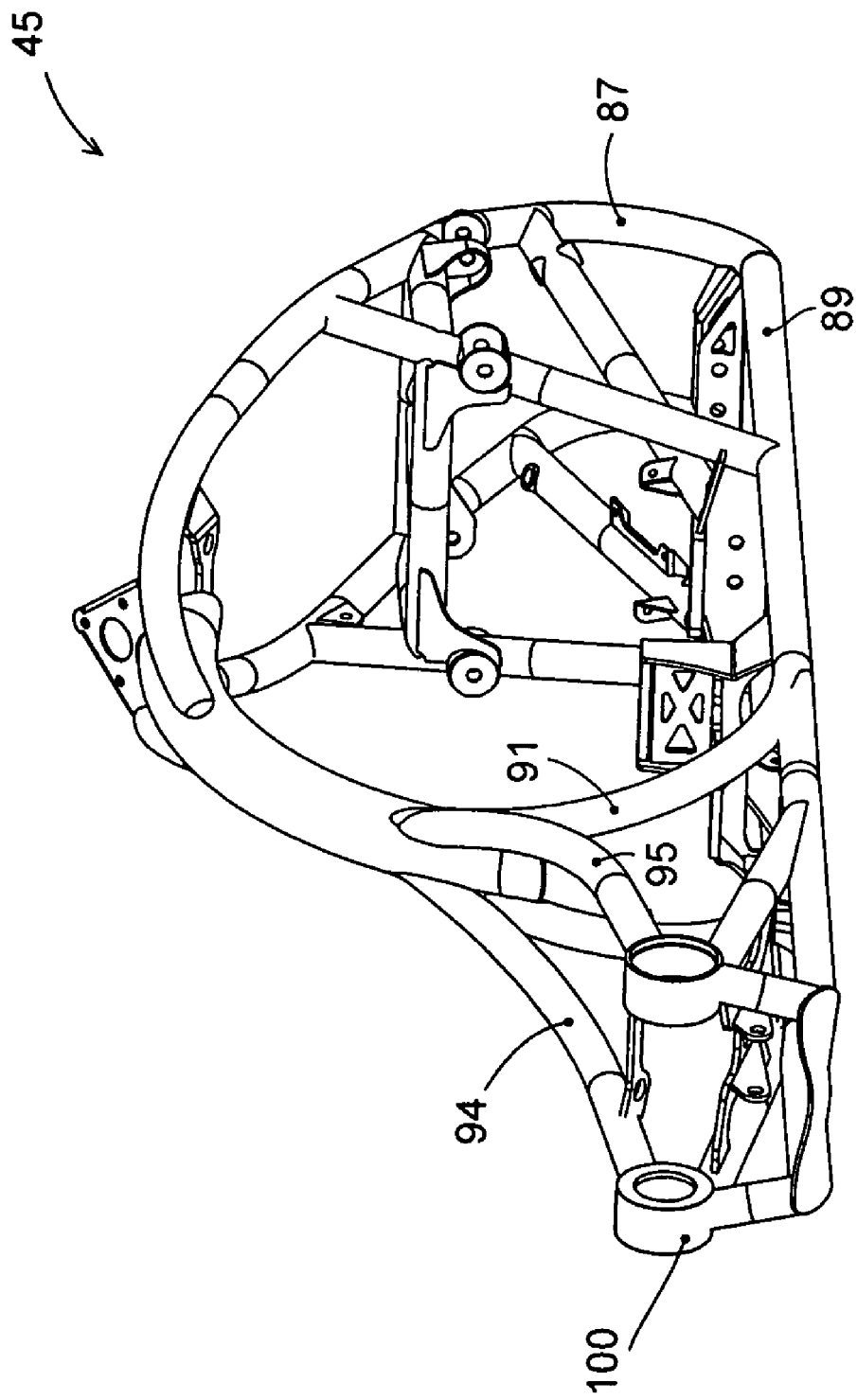
FIG. 13 is a rear right side perspective view of the frame assembly of the vehicle illustrated in FIGS. 1-6.
Figure 14:
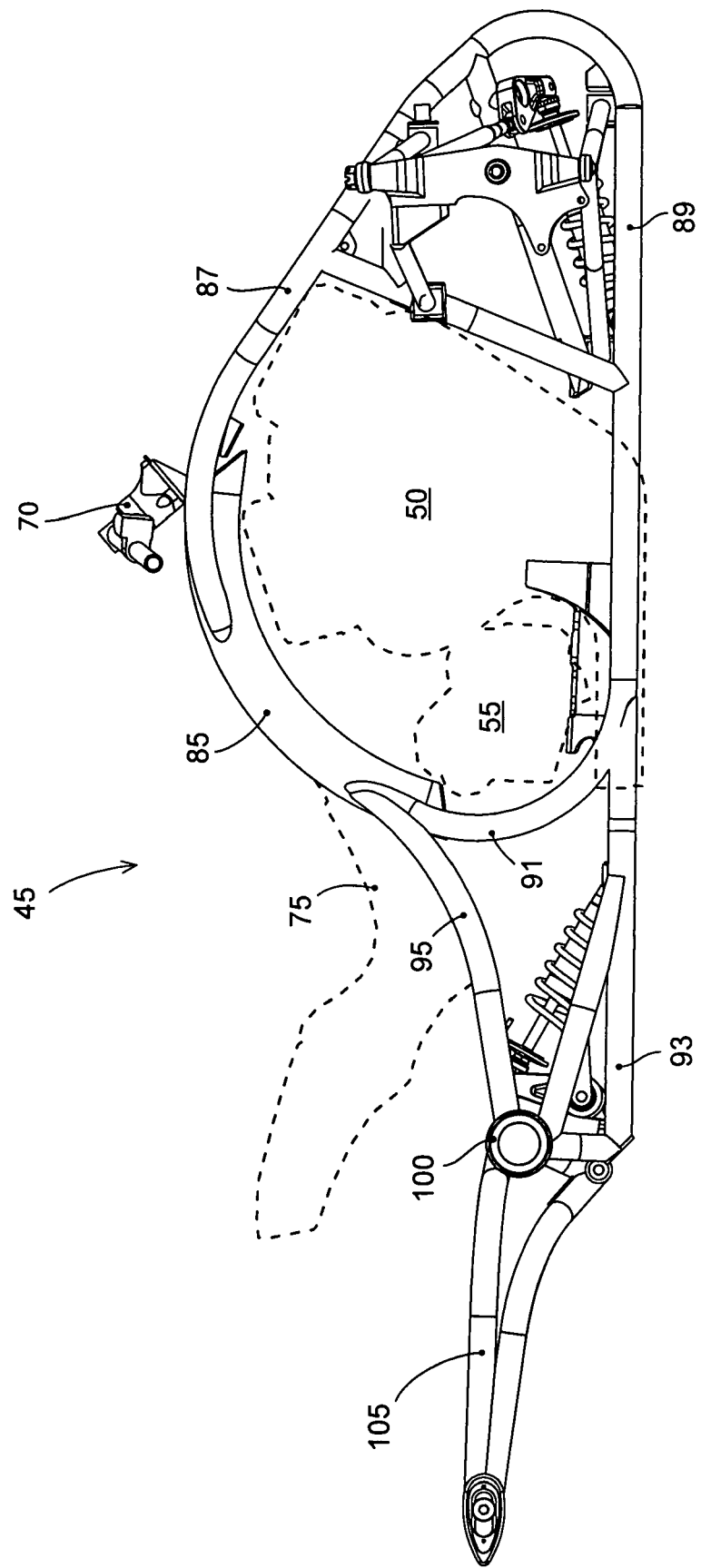
FIG. 14 is a right side view of the frame assembly and the rear suspension assembly of the vehicle illustrated in FIGS. 1-6.
Figure 15:
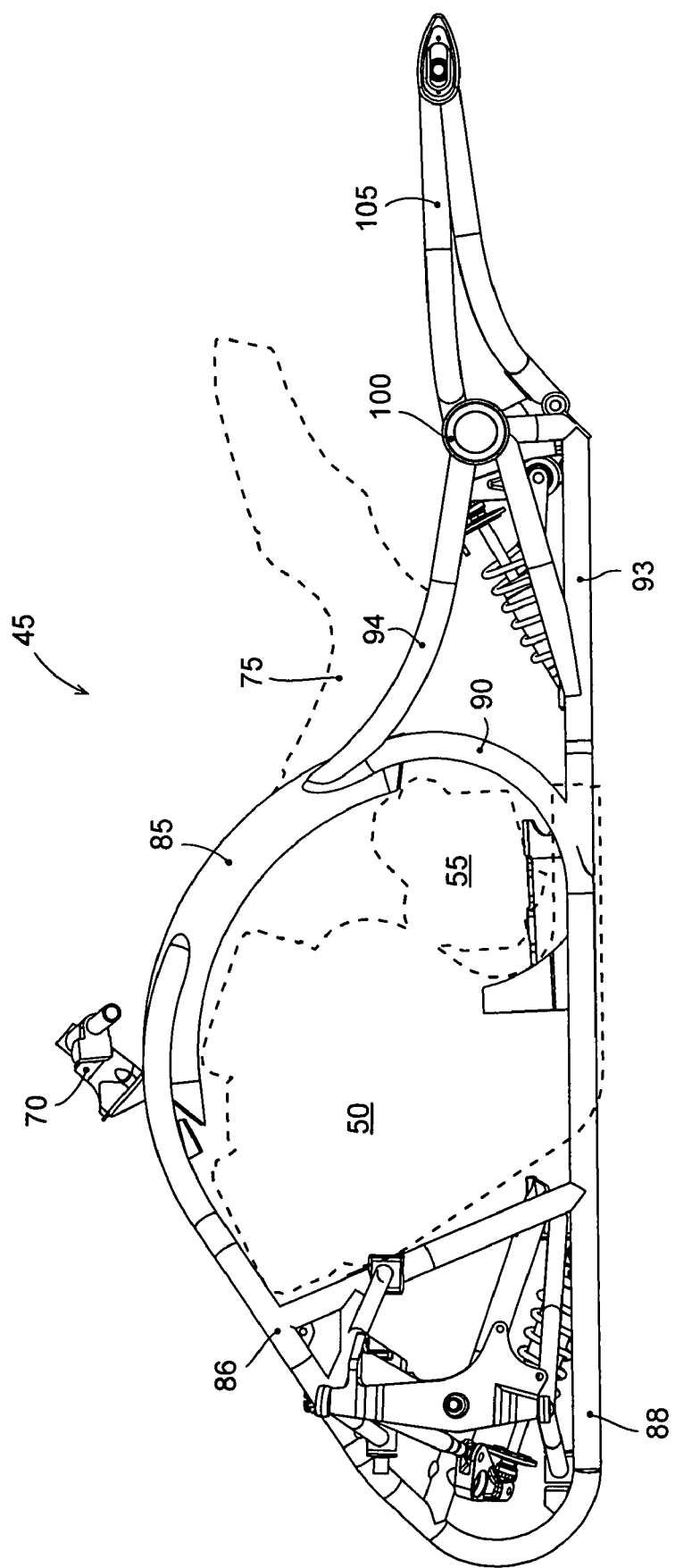
FIG. 15 is a left side view of the frame assembly and the rear suspension assembly of the vehicle illustrated in FIGS. 1-6.
Figure 16:
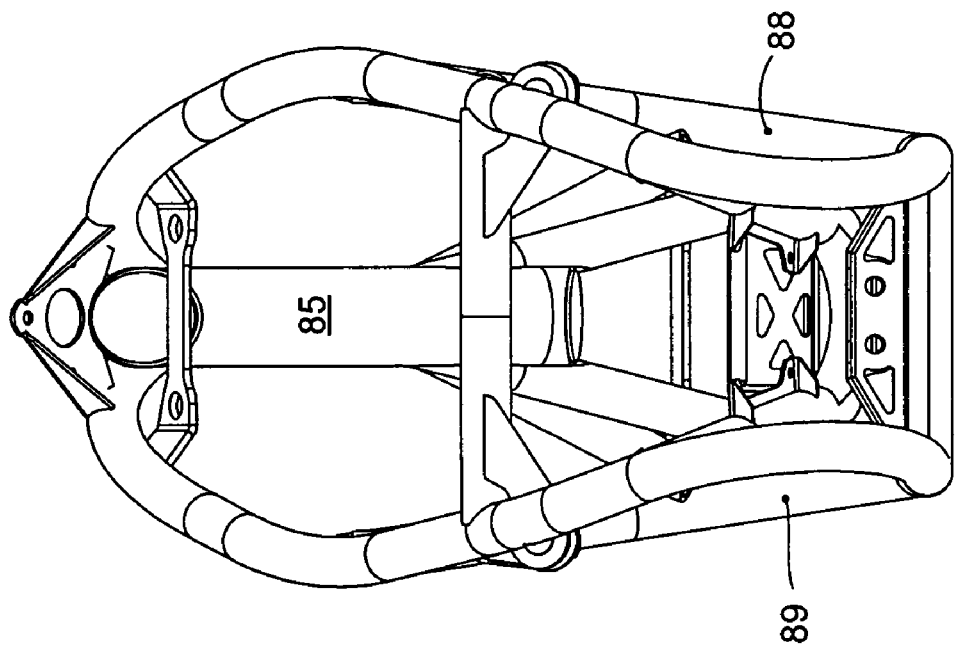
FIG. 16 is a front view of the frame assembly of the vehicle illustrated in FIGS. 1-6.
Figure 17:
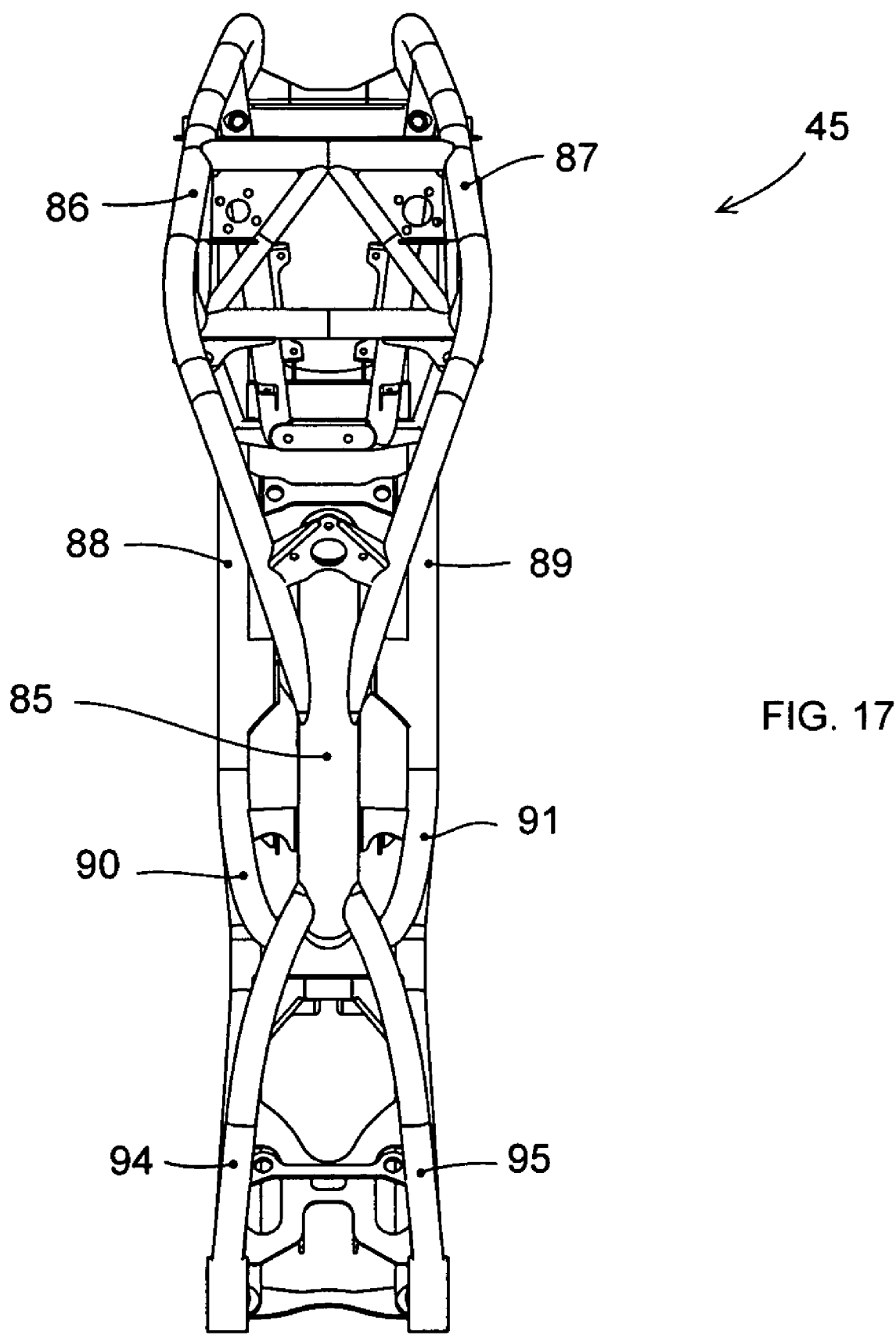
FIG. 17 is a top view of the frame assembly of the vehicle illustrated in FIGS. 1-6.
Figure 18:
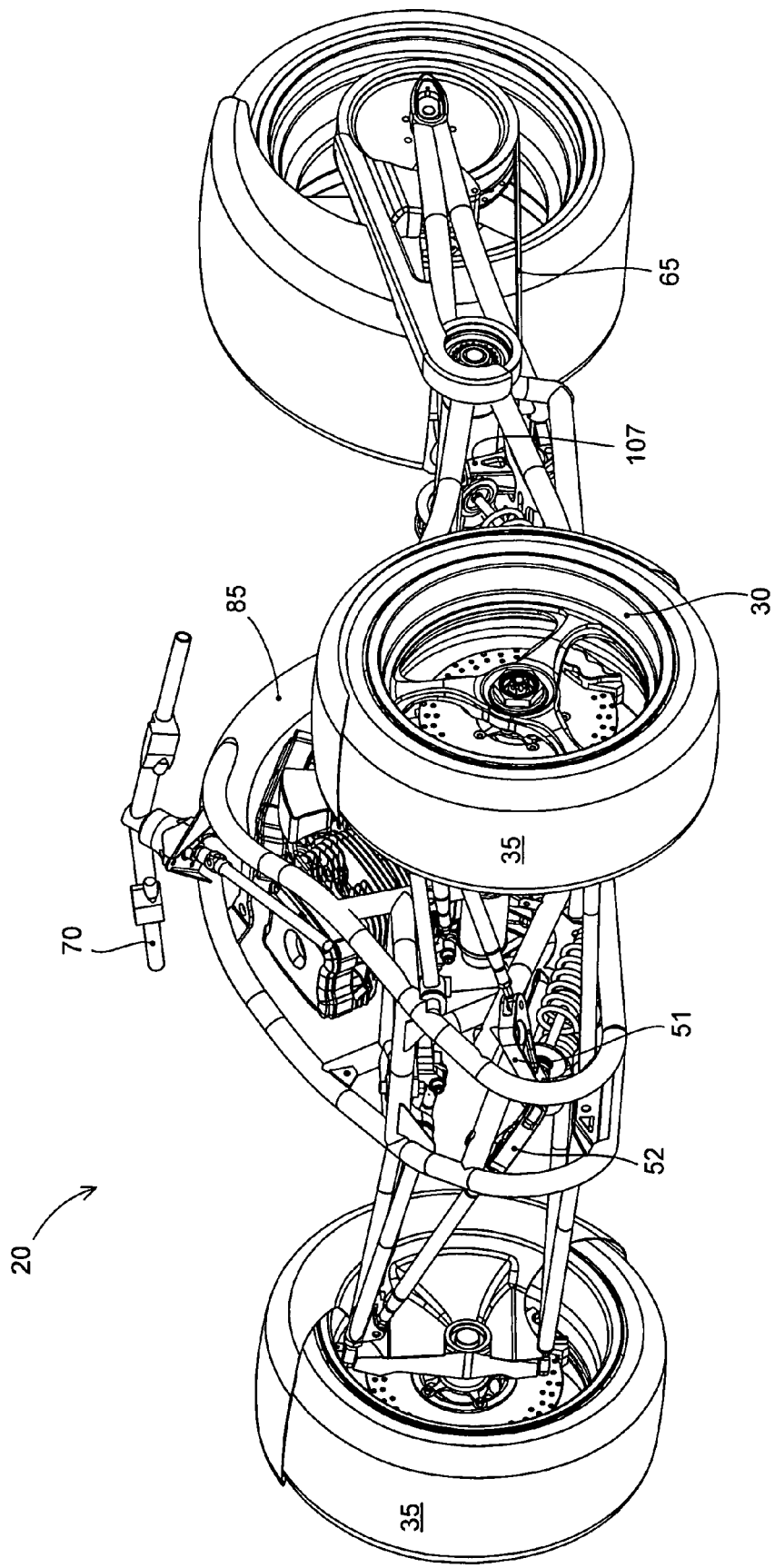
FIG. 18 is front left side perspective view of the vehicle illustrated in FIGS. 1-6.
Figure 19:
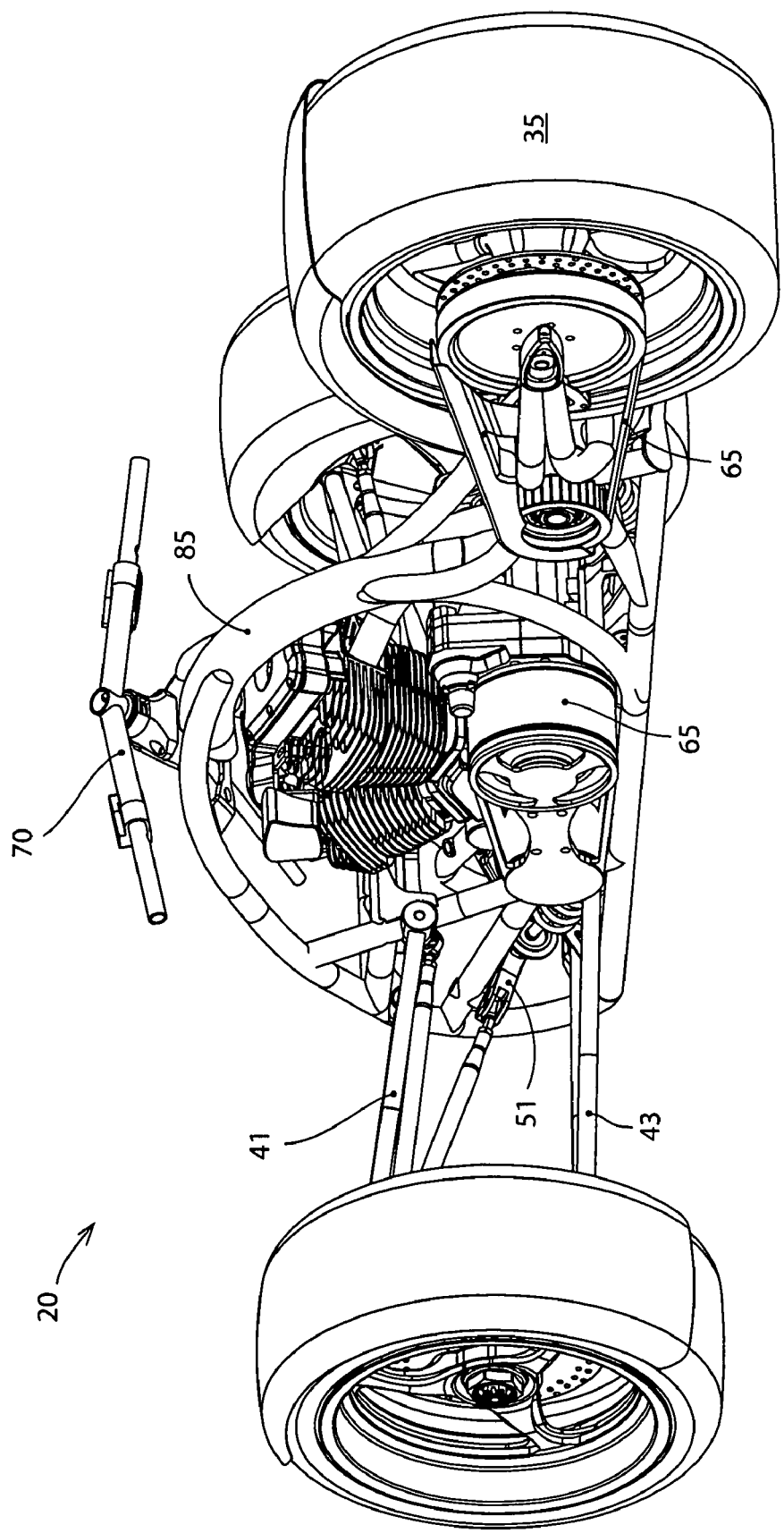
FIG. 19 is a left rear side perspective view of the vehicle illustrated in FIGS. 1-6.

For example, as shown in FIGS. 3 and 4, one feature of the TWV 20 is that when an operator is straddling the seat 75, a perineum of the operator is located below a plane 115 defined by an upper-most point of each of three wheels 25, 30, 60 mounted to the frame assembly 45. That is, as discussed in detail below, the right front wheel 25 and the left front wheel 30 are moveably coupled to a front suspension assembly 40 that is moveably coupled to the frame assembly 45. Of course, each wheel 25, 30, 60 is round and each includes an upper most point (even with a tire 35 mounted thereon). The three wheel points define plane 115, and as shown in FIG. 3, the area of the seat 75 structured to receive a perineum of the operator is located below the plane.

The low seating position is achieved by a unique frame assembly 45 that positions the engine 50, drive train 55 and rider very low so that the center of gravity of the TWV 20 is kept low, thereby increasing safety by making the TWV 20 extremely stable with excellent handling characteristics.

Referring now to FIGS. 12-17 the frame assembly 45 is illustrated. The frame assembly comprises a single upper frame element 85 having a left upper spar 86 and a right upper spar 87 extending forward and laterally from a front section of the single upper frame element 85. The left and right upper spars each include a downward-extending portion that attaches to a left lower spar 88 and a right lower spar 89. The left lower spar 88 and a right lower spar 89 form a portion of the bottom of the frame assembly 45.

A left rear spar 90 and a right rear spar 91, are each laterally spaced and are connected to the left lower spar 88 and the right lower spar 89, respectively, at a forward end of each rear spar. Both spars 90 and 91 then curve upward with a second end of each connecting to a rear section of the single upper frame element 85.

As shown in FIGS. 12-17, the frame assembly 45 includes a rear suspension sub-frame that includes the a pivot mount 100 for the rear swing-arm 105. The rear suspension sub-frame comprises a left lower sub-frame spar 92 and a right lower sub-frame spar 93, both of which are laterally spaced and connected to the left lower spar 88 and the right lower spar 89, respectively, at a forward end, with the rear section of each sub-frame spar 92, 93 terminating in a substantial L-shape that supports the pivot mount 100. The rear suspension sub-frame also includes a left upper sub-frame spar 94 and a right upper sub-frame spar 95, both of which are laterally spaced and are connected to the left rear spar 90 and the right rear spar 91, respectively at a front end of each spar 94, 95. The rear end of each of the left upper sub-frame spar 94 and a right upper sub-frame spar 95 are connected to the pivot mount 100.

One feature of the frame assembly 45 is that the single upper frame element 85, in one embodiment, may form an engine oil reservoir. That is, the hollow single upper frame element 85 may be used to hold the oil used to lubricate the engine 50 and drive train 55. In one embodiment, an oil filler and oil level dipstick (not shown) may be located near the handlebar assembly 70, along with a vent and an oil return that receives oil from the engine 50. The oil feed line to the engine 50 may be located lower down on the single upper frame element 85. Also, in another embodiment, the single upper frame element 85 may be modified to be constructed of two tubular elements, rather than a single large element. It will be appreciated that many of the spars comprising the frame are tubular elements, but may also be comprised of other cross-sections, such as oval or square, or other shapes.

Referring now to FIGS. 7-11, a front suspension assembly 40 and the rear swing arm 105 are illustrated. The front suspension assembly 40 is comprised of left and right upper A-arms 41, 42, respectively, and left and right lower A-arms, 43, 44, respectively. A left and right pull-rod 46, 47, respectively, is attached to a left and right upright 48, 49, and also to a left and right bell-crank, 51, 52, respectively, that each actuate a left and right damper/spring unit, 53, 54, respectively. One feature of the front suspension assembly 40 is that the damper/spring units 53, 54, are mounted in the frame assembly 45, thereby minimizing unsprung weight which improves the handling characteristics of the TWV 20.

The rear swing arm 105 is comprised of upper and lower swing-arm spars, that join each other at a distal end to house the rear axle 110. The forward end of the rear swing arm 105 pivotally mounts to the pivot mount 100. The rear swing arm 105 actuates a rear damper/spring unit 106 though a rear bell-crank assembly 107.

For the purposes of interpreting words used in the claims, it is to be noticed that the term "comprising", should not be interpreted as being limitative to the claim elements listed thereafter. Thus, the scope of the expression "a device comprising elements A and B" should not be limited to devices consisting only of components A and B. It means that with respect to the present invention, the only relevant components of the device are A and B.

Similarly, it is to be noticed that the term "coupled", also used in the claims, should not be interpreted as meaning attached or joined together, but not limitative to direct connections only. Thus, the scope of the expression "an element A coupled to an element B" should not be limited to devices wherein element A is directly connected to element B. It means that there exists a path between A and B which may be a path including other elements or means. In addition, when element A is "coupled" to element B, relative motion may be allowed between element A and element B.

Thus, it is seen that a three-wheel vehicle is provided. One skilled in the art will appreciate that the three-wheel vehicle can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the three-wheel vehicle as well. That is, while the three-wheel vehicle has been described in conjunction with specific embodiments, it is evident that many alternatives, modifications, permutations and variations will become apparent to those of ordinary skill in the art in light of the foregoing description. Accordingly, it is intended that the three-wheel vehicle embrace all such alternatives, modifications and variations as fall within the scope of the appended claims. The fact that a product exhibits differences from one or more of the above-described exemplary embodiments does not mean that the product is outside the scope (literal scope and/or other legally-recognized scope) of the following claims.

What is claimed is:

1. A three-wheeled vehicle, comprising:
   a single upper frame element having a left and a right upper spar extending forward and laterally from a front section of the single upper frame element, the left and right upper spars each including a downward-extending portion;
   a left lower spar and a right lower spar, each laterally spaced and connected to the left and right upper spars at the downward-extending portion of the left and right upper spars, respectively;
   a left rear spar and a right rear spar, each laterally spaced and connected to the left lower spar and the right lower spar, respectively, at a first end, with a second end of each left and right rear spar connecting to a rear section of the single upper frame element; and
   a seat coupled to the frame, with the seat located so that when an operator is straddling the seat, a perineum of the operator is located below a plane defined by an upper-most point of each of three wheels mounted to the frame through a front and a rear suspension assembly.

2. The three-wheel vehicle of claim 1, further comprising a rear suspension sub-frame comprising a upper portion connected to the rear section of the single upper frame member, and a lower portion connected to the left and right rear spars.

3. The three-wheel vehicle of claim 2, where the rear suspension sub-frame comprises a left lower sub-frame spar and a right lower sub-frame spar, both of which are laterally spaced and connected to the left and right rear spars, respectively, at a forward end, with a rear end of each sub-frame spar terminating in a substantial L-shape that supports a pivot mount for a rear swing arm.

4. The three-wheel vehicle of claim 3, where the rear suspension sub-frame further comprises a left upper sub-frame spar and a right upper sub-frame spar, both of which are laterally spaced and are connected to an upper end of each of the left and right rear spars, respectively, at a forward end, with a rear end of the left and right upper sub-frame spars connected to the pivot mount.

5. The three-wheel vehicle of claim 1, further comprising a fuel tank located in a seat support structured to support the seat, with the seat support coupled to the frame.

6. A frame for a three-wheel vehicle, the frame comprising:
   a pair of laterally spaced, longitudinally extending lower frame spars;
   a pair of laterally spaced brackets for supporting a rear swing arm, the brackets connected to the pair of lower frame spars;
   a pair of laterally spaced, longitudinally extending seat supporting frame spars, the seat supporting frame spars extending forward from the pair of swing arm support brackets; and
   an upper backbone element that extends longitudinally above at least a portion of the pair of lower frame spars, with the upper backbone element connected to a forward section of each of the pair of the seat supporting frame spars.

7. The frame of claim 6, where the upper backbone element is a single frame spar.

8. The frame of claim 6, where the upper backbone element is hollow and contains engine oil.

9. The frame of claim 6, further comprising an engine coupled to the frame, and a seat coupled to the frame, with the seat located so that when an operator is straddling the seat, a perineum of the operator is located below a plane defined by an upper-most point of each of three wheels mounted to the frame through a front and a rear suspension assembly.

10. A three-wheel vehicle, comprising:
    a single upper frame element having a left and a right upper spar extending forward and laterally from a front section of the single upper frame element, the left and right upper spars each including an downward-extending portion;
    a left lower spar and a right lower spar, each laterally spaced and connected to the left and right upper spars at the downward-extending portion of the left and right upper spars, respectively;
    a left rear spar and a right rear spar, each laterally spaced and connected to the left lower spar and the right lower spar, respectively, at a first end, with a second end of each left and right rear spar connecting to a rear section of the single upper frame element;
    a rear suspension sub-frame coupled to the left and right rear spars, with a wheel rotatably coupled thereto;
    a front suspension assembly coupled to the downward-extending portion of the left and right upper spars, with a left and a right wheel rotatably coupled thereto; and
    a seat coupled to the rear suspension sub-frame, with the seat located so that when an operator is straddling the seat, a perineum of the operator is located below a plane defined by an upper-most point of each of the three wheels.

11. The three-wheel vehicle of claim 10, where the rear suspension sub-frame comprises a left lower sub-frame spar and a right lower sub-frame spar, both of which are laterally spaced and connected to the left and right rear spars, respectively, at a forward end, with a rear end of each sub-frame spar terminating in a substantial L-shape that supports a pivot mount for a rear swing arm.

12. The three-wheel vehicle of claim 11, where the rear suspension sub-frame further comprises a left upper sub-frame spar and a right upper sub-frame spar, both of which are laterally spaced and are connected to an upper end of each of the left and right rear spars, respectively, at a forward end, with a rear end of the left and right upper sub-frame spars connected to the pivot mount.

13. The three-wheel vehicle of claim 10, further comprising a fuel tank located in a seat support structured to support the seat, with the seat support coupled to the rear suspension sub-frame.

* * * * *